United States Patent [19]

Grahl

[11] 3,722,923
[45] Mar. 27, 1973

[54] COUPLING JOINT FOR PLASTIC COVERED METAL TUBE

[75] Inventor: Darwin Grahl, Novelty, Ohio

[73] Assignee: Parker-Hannifin Corporation, Cleveland, Ohio

[22] Filed: Apr. 8, 1971

[21] Appl. No.: 132,405

[52] U.S. Cl. ............... 285/55, 285/249, 285/382.7
[51] Int. Cl. ............................................. F16l 19/08
[58] Field of Search .... 285/382.7, 341, 342, 343, 55, 285/45, 382, 249; 174/78, 84 S

[56] References Cited

UNITED STATES PATENTS

| | | | |
|---|---|---|---|
| 3,643,984 | 2/1972 | Bucceri | 285/382.7 X |
| 3,554,999 | 1/1971 | Shaw et al. | 285/45 X |
| 3,362,717 | 1/1968 | Bram | 285/55 X |
| 1,184,273 | 5/1916 | Terry et al. | 285/341 X |
| 2,423,632 | 7/1947 | Ansorge | 285/249 |
| 3,109,052 | 10/1963 | Dumire et al. | 285/341 X |
| 3,499,671 | 3/1970 | Osborne | 285/382.7 X |
| 969,423 | 9/1910 | Tanner et al. | 285/55 X |
| 2,646,822 | 7/1953 | Ferguson | 285/55 |
| 3,477,750 | 11/1969 | Powell | 285/382 X |
| 2,480,496 | 8/1949 | Mercier | 285/382.7 X |

Primary Examiner—Thomas F. Callaghan
Attorney—John N. Wolfram

[57] ABSTRACT

A tube coupling joint comprising a metallic tube with a non-metallic sheath, the tube coupling including a sleeve deformed into gripping engagement with the metallic tube and into sealing engagement with the non-metallic sheath.

4 Claims, 3 Drawing Figures

Patented March 27, 1973 3,722,923

INVENTOR
DARWIN R. GRAHL
ATTORNEY
John N. Wolfram

COUPLING JOINT FOR PLASTIC COVERED METAL TUBE

BACKGROUND OF THE INVENTION

For some installations, as for example, refrigerant conduits for an air conditioning system in which a compressor is mounted outside a building and an evaporator is installed within the building, it is desirable to use a metallic tube, such as aluminum, to provide strength and rigidity. However, such tubes are subject to corrosion, particularly where they are in contact with mortar or concrete where the tube passes through a building foundation wall and also within the coupling where the latter grips and seals the tube. Such metallic tube can be protected against corrosion at the foundation wall by covering the tube with a thin sheath of inert plastic material, but there still remains the problem of preventing corrosion where the tube is gripped by coupling members. It is particularly important to protect the tube from corrosion at the gripping location because the gripping element usually cuts through the thin oxide film usually present on the outer surface of the tube and establishes a region of nascent metal-to-metal contact that is much more susceptible to corrosion than portions of the tube having an oxide film.

SUMMARY OF THE INVENTION

The present invention provides a tube coupling joint for a metallic tube having a non-metallic sheath in which the coupling includes a sleeve that is deformable so as to cut through the sheath into gripping engagement with the metal tube but yet establishing sealing engagement with the sheath to prevent access of moisture or other corrosive fluids to the metal tube where it is gripped by the sleeve. Such sealing engagement is obtained on both sides of the tube gripping engagement to prevent access of fluid to the gripping area from either direction.

DESCRIPTION

Figure 1:
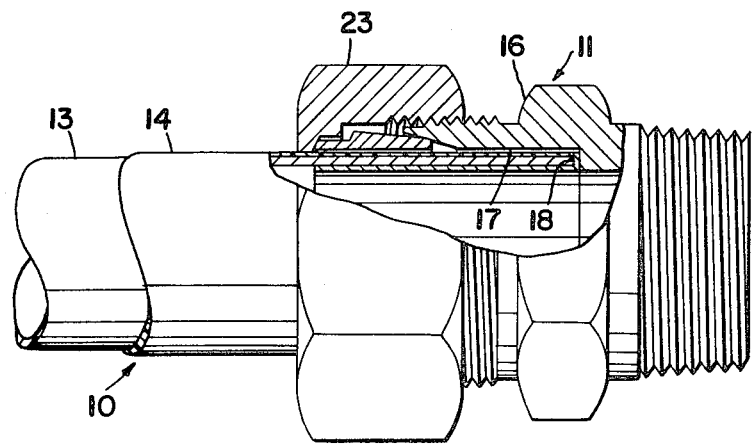
FIG. 1 is a view, partly in cross section of the joint.
Figure 2:
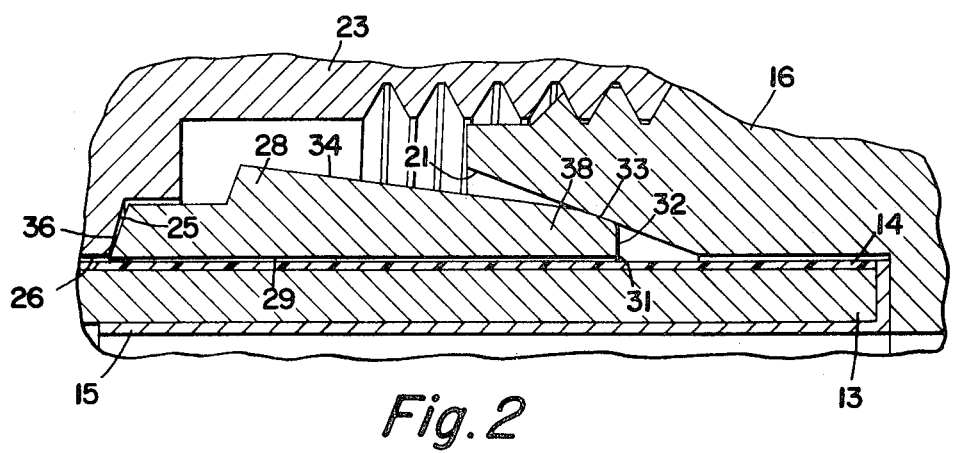
FIG. 2 is an enlarged fragmentary cross section view of the joint parts in initial untightened condition.

The joint includes a tube 10 and tube coupling 11. The tube comprises a metallic tube 13 having a thin sheath 14 of non-metallic material, such as polyethyelene, that completely covers the outer surface of the metal tube. The sheath may be quite thin, for example for a tube of ¾ inch O.D. the sheath may have a thickness on the order of 0.012 inch and preferably between 0.008 and 0.020 inch. A metallic liner 15 is preferably inserted into tube 13 to support the same against radially inward deflection during makeup of the joint.

The coupling is generally similar to that shown in U.S. Pat. No. 3,499,671 and comprises a body 16 having a bore 17 to receive the tube and a shoulder 18 against which the end of the tube abuts. Outwardly of bore 17 is a frusto-conical cam surface 21 and a nut 23 is threadedly connected to the body. The nut has a frusto-conical shoulder 25 at its rear portion and has a bore 26 that has about 0.005 inch diametral clearance with the tube so as to have a slip fit therewith.

A sleeve 28 is between the nut and body and has a bore 29 that is initially a slip fit with the tube throughout the length of the sleeve. The inner end of the sleeve has a sharp corner 31 that serves as a cutting edge and there is a transverse surface 32 rounded at its outer edge to merge with a conical surface 34. At its outer end the sleeve has a cylindrical portion 35 terminating in a frusto-conical shoulder 36 that initially has a slightly greater inclination from a transverse plane than does nut shoulder 25.

Figure 3:
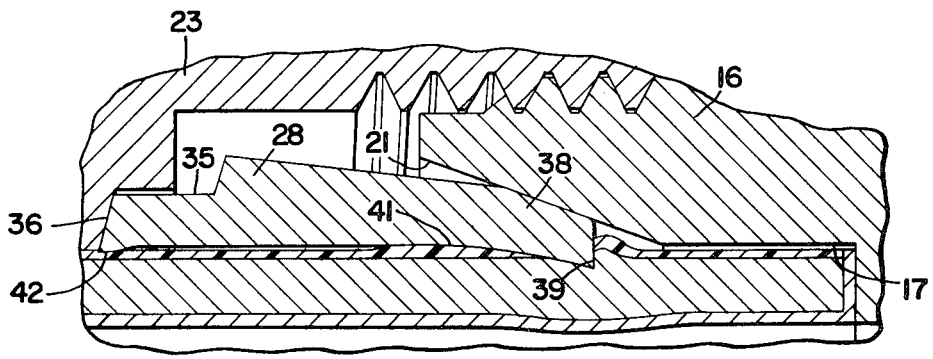
FIG. 3 is a view like FIG. 2 except that the joint is in the tightened condition.

Upon tightening of the nut by threading upon body 16, nut shoulder 25 engages sleeve surface 36 to drive the sleeve forcibly against body cam surface 21 which causes the forward portion 38 of the sleeve to deform radially inward as it moves axially inward. This causes sleeve cutting edge 31 to shear through plastic sheath 14 and cut its way into the wall of metal tube 13 in a manner to form a holding shoulder 39 on the metal tube that is engaged by the front face 32 of the sleeve for securely gripping the tube to prevent its withdrawal from the coupling. Moreover, contact of the sleeve at cutting edge 31 and on both sides thereof, with the metal tube establishes a seal at these locations, and contact of outer edge 33 with cam surface 21 (which widens into area contact as shown in FIG. 3) establishes a seal at this location.

Metal tubes of aluminum or other metals normally have an oxide film on their surfaces due to exposure to air. This will normally be the base case with tube 13, even though it is covered with a plastic sheath. When sleeve 28 cuts into the metal tube it penetrates the oxide film and bares the metal which is then especially vulnerable to corrosion in the event moisture or other fluids have access thereto.

When the sleeve cutting edge 31 shears into and through the plastic sheath, the material of the latter displaces forwardly for the most part and builds up in front of sleeve surface 32 and presses into sealing contact therewith. Some of the sheath material displaces rearwardly as at 41 and is tightly squeezed between the deformed portion 38 of the sleeve and the metal tube to seal the cut portion of the metal tube from moisture or other fluids exterior of the joint.

During tightening of the nut the rear portion of the sleeve also contracts radially to engage the sheath, as shown at 42 to further serve as a moisture seal or barrier but the sleeve does not cut through the sheath at this point.

I claim:

1. A tube coupling joint comprising a metallic tube having a thin sheath of displaceable plastic material, a coupling body having a bore that receives an end of said tube and having a cam surface outwardly of said bore, a nut threaded onto the body, a sleeve having a circumferentially continuous deformable portion at its inner end engaging said cam surface, a forward end face, and a shoulder engaged by said nut, said body having a shoulder against which the inner end of the tube abuts, said deformable sleeve portion having a cutting edge that is radially deformed by said cam surface upon tightening of said nut whereby said edge engages and cuts through said sheath and cuts into said metallic tube for gripping the same, said cam surface being constructed to permit forward axial motion of said sleeve relative to the tube as said deformable portion deforms radially whereby said edge cuts through the sheath and into the wall of said tube in a manner to form an outwardly radially extending holding shoulder on said tube and whereby the sheath is displaced forwardly and builds up in front of said forward end face and presses into sealing contact therewith, said sleeve having a surface rearwardly of said edge that is radially deformed into sealing engagement with said sheath upon tightening of said nut.

2. The joint of claim 1 in which said rearward surface is on said deformable portion.

3. The joint of claim 1 in which said sleeve has another deformable portion at its outer end, means on said nut for radially deforming said another deformable portion into sealing engagement with said sheath, said another deformable portion having only a smooth surface of substantial area opposite said sheath and engageable therewith whereby said area engages the sheath without cutting through the same.

4. The joint of claim 1 in which said sheath is made of polyethylene plastic.

* * * * *